United States Patent

[11] 3,621,400

[72] Inventors Leonard J. Paciorek
North Syracuse;
Carl W. Gerst, Skaneateles, both of N.Y.
[21] Appl. No. 816,986
[22] Filed Apr. 17, 1969
[45] Patented Nov. 16, 1971
[73] Assignee Anaren Microwave, Incorporated
Syracuse, N.Y.

[54] ALTERNATING CURRENT SIGNAL-COMBINING APPARATUS
14 Claims, 12 Drawing Figs.

[52] U.S. Cl. 325/446, 333/11, 325/450
[51] Int. Cl. H04b 1/26
[50] Field of Search 333/10; 325/446, 9, 450

[56] References Cited
UNITED STATES PATENTS

| | | | |
|---|---|---|---|
| 3,310,748 | 3/1967 | Putnam | 325/446 |
| 3,345,585 | 10/1967 | Hildebrand | 333/10 |
| 3,512,090 | 5/1970 | Mauw | 325/446 |
| 3,346,823 | 10/1967 | Maurer et al. | 333/11 |

*Primary Examiner*—Robert L. Griffin
*Assistant Examiner*—R. S. Bell
*Attorney*—Camil P. Spiecens

ABSTRACT: A plurality of 3 db. couplers interconnect two signal sources to a signal utilization device. By virtue of the properties of the couplers and their interconnections there is achieved good signal isolation and low voltage standing wave ratios. Several examples of signal heterodyning devices such as mixers and modulators are shown as well as linear signal-combining devices.

INVENTORS
Leonard J. Paciorek
Carl W. Gerst
BY
ATTORNEY

ALTERNATING CURRENT SIGNAL-COMBINING APPARATUS

This invention relates to a signal-processing apparatus and more particularly to the combining of two alternating current signals.

Signal-combining devices have many applications in signal processing. Quite often it is necessary to feed two different signals to a common transmission point for retransmission. In such a case the signals are superimposed or even multiplexed and transmitted as a single signal with each component retaining its own identity. Other times two signals are fed to the same device for heterodyning (mixing or modulating) whereby the resulting signal is different from either of the two signals. Such signal-heterodyning devices have many applications in frequency-shifting techniques wherein an input RF (radiofrequency) signal is mixed with a LO (local oscillator) frequency signal to provide an IF (intermediate frequency) signal which is generally a signal having a frequency which is the difference of the frequencies of the two input signals or wherein a carrier frequency signal is modulated by modulating frequency signal to provide a modulated frequency signal.

In any event there arises the problem of isolating the sources of the two signals from each other since they feed their signals to a common point.

It is accordingly an object of the invention to provide a device for combining signals from two sources with a high degree of isolation between the sources.

When the signals being combined are in the microwave range efficient operation demands a minimum of signal reflections To achieve this minimum it is necessary to impedance match the components of the device. However, signal mixers require nonlinear impedance components and it is difficult to obtain low voltage standing wave (VSW) ratios at the inputs of the combining device.

It is accordingly another object of the invention to provide a signal-combining device which has low VSW ratios at the input ports of the device.

It is a more specific object of the invention to provide an improved AC signal device for heterodyning a first frequency signal with a second frequency signal which has high isolation between the source of the signals as well as a low VSW ratio at the signal input ports.

Briefly, the invention contemplates at least two interconnected couplers for interconnecting two signal sources and a signal utilization device. Each of the couplers has first and second pairs of ports wherein a signal received at one port of either pair of ports is transmitted equally (with the same amplitude) from the two ports of the other pair of ports, and wherein each port of either pair of ports is signalwise isolated from the other port of the same pair of ports. The interconnections are such that the two signal sources are mutually isolated.

Other objects, the features and advantages of the invention will be apparent from the following detailed description when read with the accompanying drawings wherein.

Figures 1, 2, 3, 4, 5, 6, 7, 8, 9:
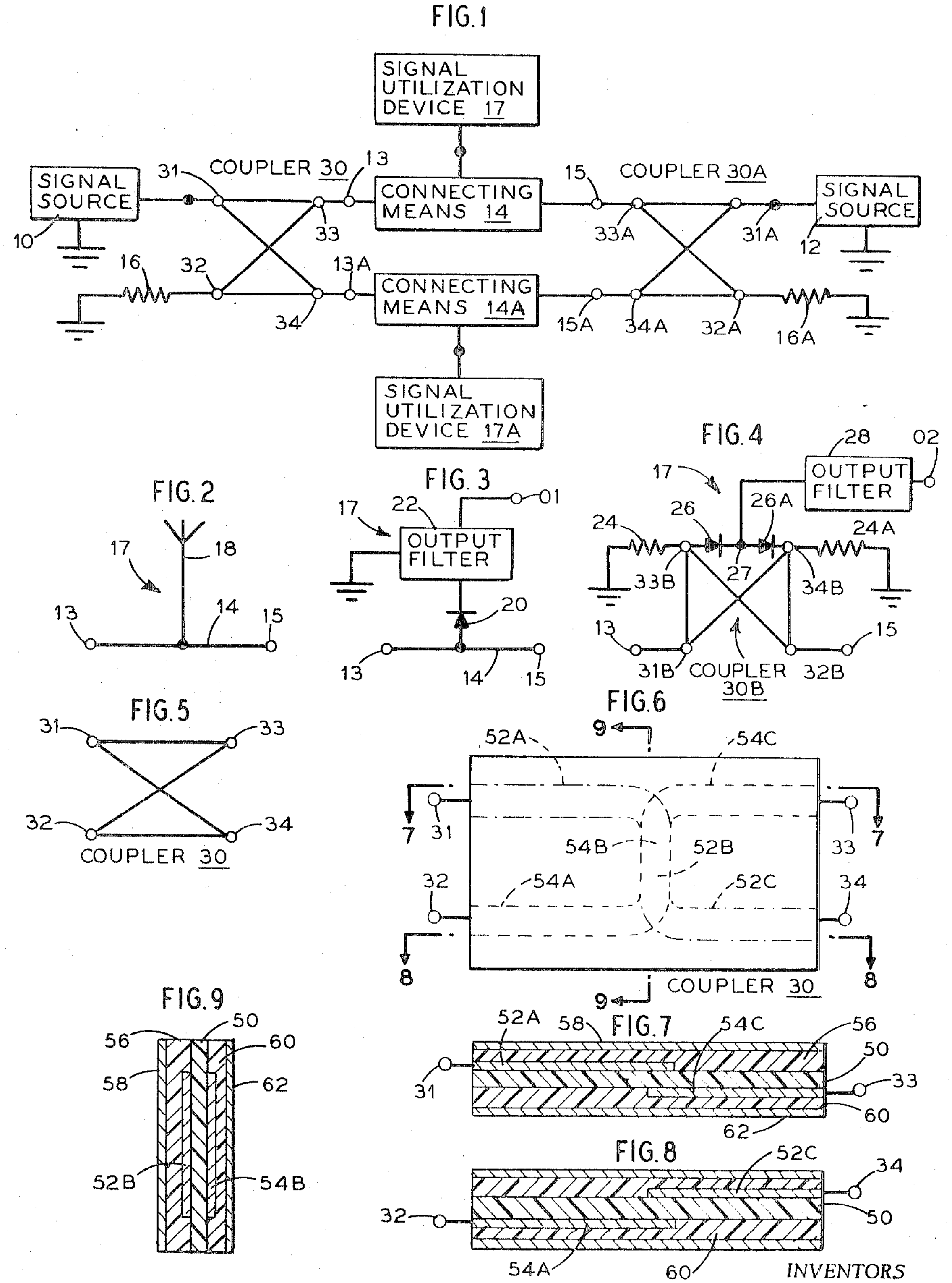
FIG. 1 shows schematically apparatus for feeding two signals, via couplers, to a signal utilization means for combining therein.
FIG. 2 shows schematically a signal utilization means in the form of an antenna for superimposing the two signals.
FIG. 3 shows schematically a signal utilization means for mixing the two signals.
FIG. 4 shows schematically another embodiment of a signal mixer.
FIG. 5 shows the symbol for a 3 db. coupler of FIG. 1.
FIG. 6 shows a top view of a 3 db. coupler using strip line technology.
FIG. 7 shows a sectional view taken along the line 7—7 of FIG. 6.
FIG. 8 shows a sectional view taken along the line 8—8 of FIG. 6.
FIG. 9 shows a sectional view taken along the line 9—9 of FIG. 6.

Before describing the apparatus of FIG. 1 it is worthwhile to describe the properties of the couplers used therein. The symbol for a typical coupler 30 is shown in FIG. 5. The coupler 30 is linear and reciprocal. The coupler also has a given bandpass and has a characteristic impedance at its signal transfer ports. Normally, the signal energy being processed has frequencies within the passband of the coupler and devices connected to the coupler have input and output impedances which match the characteristic impedance of the couplers. For the sake of definiteness the ports 31 and 32 are considered to be the input ports of the coupler and the ports 33 and 34 are considered to be the output ports of the coupler. Because of the reciprocal nature of the coupler, the input ports and output ports can be interchanged.

The coupler 30 as a 3 db. coupler of the 90° type will now be described. If a microwave signal is received at the first input port 31 the power or energy of the signal is split into two equal quantities. One quantity is fed to the first output port 33 and the other is fed to the second output port 34. The signal phase of the power transmitted from output port 33 is advanced by 90 electrical degrees from the signal phase of the power transmitted from output port 34. Thus, if the signal power received at input port 31 is represented by the quantity A, the ports 33 and 34 transmit signal energy having voltages represented by the quantities $\frac{A}{\sqrt{2}}$ and $\frac{-jA}{\sqrt{2}}$ respectively. Similarly, if a signal is received at the second input port 32, the power of the signal is split into two equal quantities, one half of the power is fed to each of the output ports 33 and 34. The signal phase of the power transmitted from output port 34 is advanced by 90 electrical degrees from the signal phase of the power transmitted from output port 33. Thus, if the signal power received at input port 32 is represented by the quantity B, the ports 33 and 34 transmit signal power having voltages represented by the quantities $\frac{-jB}{\sqrt{2}}$ and B/2, respectively. If signal power is simultaneously applied to input ports 31 and 32, signal superposition occurs because the coupler is linear. Therefore, by using the above-indicated terminology, when signal power received at input port 31 is represented by A and the signal power received at input port 32 is represented by B, output port 33 transmits signal power having a voltage represented by $\frac{(A-jB)}{\sqrt{2}}$ and output port 34 transmits signal power having a voltage represented by $\frac{(-jA+B)}{\sqrt{2}}$. Hence, the names 3 db. coupler or 90 degree hybrid. Two points are worth repeating: (1) any power received at an input port is divided equally between the output terminals, and (2) the signals transmitted by the output ports have a 90 degree phase difference. It should be noted that all of the power received at one input port is transmitted to the two output ports and none to the other input port. In other words, the input ports are isolated from each other.

Now, if ports 33 and 34 were to receive signals whose voltages were represented by the quantities $\frac{kA}{\sqrt{2}}$ and $\frac{-kjA}{\sqrt{2}}$, respectively, where $k$ is a quantity which can represent attenuation and phase shift, then there is transmitted a signal from port 31 having a voltage $ka/2+kj^2A/2=0$, and from port 32 a signal having a voltage $-kjA/2-kjA/2=-jkA$. The important point to note is that no signal is transmitted from port 31.

Now with these facts in mind the signal-combining apparatus of FIG. 1 will now be described. Since several similar couplers will be used all couplers and their ports will bear the same reference numeral with a different letter postscript.

The apparatus comprises a signal source 10 for generating AC (alternating current) signals. The output terminal or port of signal source 10 is connected to a first input port 31 whose other input port 32 is connected to ground via a signal dissipation means in the form of a resistor 16 whose impedance matches the output impedance of port 32. The output port 33 of coupler 30 is connected to one terminal 13 of connecting means 14 while the other output port is coupled to one terminal 13A of connecting means 14A.

A second signal source 12 for generating AC signals is connected to a first input port 31A of coupler 30A whose other input port 32A is connected to ground via a resistor 16A. The output port 33A of coupler 30A is connected to the other terminal 15 of connecting means 14, and output port 34A is connected to the other terminal of connecting means 14A.

Now if the electrical properties of connecting means 14 and 14A are the same, i.e., have the same impedance and introduce the same phase shifts the following phenomenon is to be noted in view of the previous discussion of the couplers. A signal from source 10 passes through coupler 30, connecting means 14 and 14A and coupler 30A into resistor 16A. None of the signal enters source 12. Similarly, a signal from source 12 passes through coupler 30A, connecting means 14 and 14A and coupler 30 into resistor 16. None of the signal enters source 10. In other words, sources 10 and 12 are isolated from each other. If the coupler 30 is a 3 db. coupler of the 180° type, a signal fed to port 31 of coupler 30 will only exit from port 31A of coupler 30A and a signal fed to port 32A of coupler 30A will only exit from port 32 of coupler 30. In this case, signal source 12 would be connected to port 32A while ports 31A is connected to ground via resistor 16A and the sources are isolated from each other.

Now if a signal utilization device 17 is connected to connecting means 14 a portion of the signals passing therethrough is tapped off. However, this may upset the similarity of the electrical properties of the connecting means 14 and 14A. If this is serious then another signal utilization device 17A should be connected to connecting means 14A. The utilization means need not be identical but should have the same impedance.

As a first example of apparatus consider the signal utilization device 17 to be the antenna 18 of FIG. 2 and the connecting means 14 and 14A to be signal conductors, transmission lines, coaxial cable or waveguides depending. In order to maintain the electrical symmetry it may be necessary to connect an impedance between ground and the connecting means 14A. This impedance can be an electrical network that has an impedance equal to the impedance of antenna 18 or can be a second antenna similar to antenna 18. The latter can be more desirable since it doubles the output power of the system.

When signals are generated by source 10 a portion of the signal is radiated by the antenna 18 and the remainder dissipated in resistor 16A with none entering source 12. Similarly when signals are generated by source 12, a portion thereof is radiated by antenna 18 and the remainder dissipated is resistor 16. The signals from sources 10 and 12 can be time-division multiplexed or if their frequencies are different can be simultaneously generated. In the latter case, since the impedance of the antenna 18 is substantially linear, the signals will be superimposed. Thus there has been shown apparatus for superimposing signals from two sources with the sources electrically isolated from each other.

As a second example, the apparatus will be described as a mixer wherein an RF signal is mixed with a LO signal to produce an IF (intermediate frequency) signal. In this case, signal source 10 is the RF signal source, signal source 12 the LO signal source and the connecting means 14 and signal utilization device 17 are as shown in FIG. 3. The connecting means 14 can be a signal conductor, a transmission line a coaxial cable or a waveguide depending on the frequency range. The utilization device comprises a nonlinear impedance in the form of diode 20 having one terminal connected to connecting means 14 and another terminal connected to the input of output filter 22. When the RF and LO signals enter diode 20, the usual heterodyning action occurs and the usual sum and difference frequency signals are generated. The output filter selects the desired frequency, generally the difference frequency which is transmitted from output 01. Again it may be necessary to connect a matching impedance to connecting means 14A. In fact, it is desirable to make utilization device 17A identical to the combination of diode 20 and output filter 22 and connect together the outputs 01. In this way maximum IF signal output is obtained.

Now it may occur that the impedances of the utilization device do not match the output impedances of the couplers. In such a case signals can be reflected back to the input ports resulting in high VSW ratios. Such a phenomenon can be prevented by utilizing a further coupler as a connecting means to connect the two input couplers to the signal utilization device. This technique will be shows in connection with a mixer but is equally applicable to other devices.

In particular, the device of FIG. 4 is substituted for the connecting means 14 and signal utilization device 17 wherein coupler 30B is the connecting means, and the mixing diodes 26 and 26A and output filter 28 comprise the signal utilization device. The input port 31B of coupler 30B is connected to the output port 33 of coupler 30, and the input port 32B of coupler 30B is connected to output port 33A of coupler 30A. Mixing diodes (nonlinear impedances) 26 and 26A, polarized in the same direction are connected across output ports 33B and 34B of coupler 30B. Connection to the junction 27 of the diodes is the input of output filter 28. DC return resistors 24 and 24A connect the output ports 33B and 34B to ground.

When an RF signal is generated by source 10 and an LO signal is generated by source 12, these signals are fed to the mixing diodes 26 and 26A where the heterodyning action takes place with the IF signal passing through output filter 28 to output 02.

Now a mathematical analysis shows that any mismatch in the diodes will not be fed back to the couplers 30 and 30A if the coupler 30B is a 3 db. coupler and has an impedance equal to the impedance of couplers 30 and 30A because the VSW ratio at the input ports 31B and 32B is independent of the reflection coefficients of the diodes and there is an impedance match between the couplers.

Again it is desirable to make the connecting means 14A and signal utilization device 17A similar to connecting means 14 and signal utilization device 17 to maintain the symmetry and obtain greater signal output by paralleling the outputs of the utilization devices 17 and 17A.

Each of the couplers should be a 3 db. coupler and can be of the transformer, waveguide or other type. However, a very desirable type using strip line technology is shown in FIGS 6 to 9 which will now be described.

Coupler 30 as a 3 db. coupler of the 90° type comprises a central sheet of dielectric material 50. On the top surface of sheet 50 is a first signal conductor 52 having three contiguous portions 52A, 52B and 52C angularly disposed with respect to each other. Conductor 52 is indicated by dot-dash lines in FIG. 6. On the bottom surface of sheet 50 is a second signal conductor 54 having three contiguous portions 54A, 54B and 54C, angularly disposed with respect to each other. Conductor 54 is indicated by dash lines in FIG. 6. Portions 52B and 54B are in parallel opposed relationship. The energy transfer between the two conductors 52 and 54 occurs only via these portions. The lengths of these portions are odd-integral multiples of quarter operation wavelengths. The angular disposition of the other portions is to prevent coupling at other regions. (It should be noted that the angles are exaggerated). It should be noted that the active region of the coupler per se is actually the portions 52B and 54B, the remaining portions are primarily signal leads. The ends of the portions 52B and 54B are signal transfer ports which are connected to the input and output ports. In particular, one end of portion 52B is connected via portion 52A to port 31; the other end of portion 52B is connected via portion 52C to port 34. Similarly, one end of portion 54B is connected via portion 52A to port 32; the other end of portion 54B is connected via portion 54C to port 33. Disposed on top of conductor 52 is a sheet of dielectric material 56. On the top of sheet 56 is a ground-plane element 58 in the form of a layer of conductive material. Disposed below conductor 54 is a sheet of dielectric material 60. Below sheet 60 is a ground-plane element 62 also in the form of a layer of conductive material.

Conductor 52 electromagnetically cooperates with ground-plane elements 58 and 62 to provide a transmission line of the the shielded strip line type; conductor 54 electromagnetically cooperates with ground-plane elements 58 and 62 to provide a transmission line of the shielded strip line type. Input port 31 is connected to one end of conductor 52; and input port 32 is connected to one end of conductor 54. The output ports 33 and 34 are coupled to the other ends of conductors 54 and 52, respectively.

The coupler 30 can be fabricated by photoetching the conductors 52 and 54 on opposite sides of a dielectric substrate having surfaces of a conductive material using conventional printed circuit techniques and sandwiching this substrate between two other substrates having conductive material on their outer surfaces. With such a coupler a 2:1 bandwidth is easily obtained and with moderate care an 8:1 bandwidth can be achieved.

To obtain a 180° type coupler it is only necessary to connect a 90° phase shifter to the port 33 and make the output port of the coupler the output of the phase shifter instead of port 33. A suitable phase shifter can be a Schiffman-type phase shifter.

Figure 10:
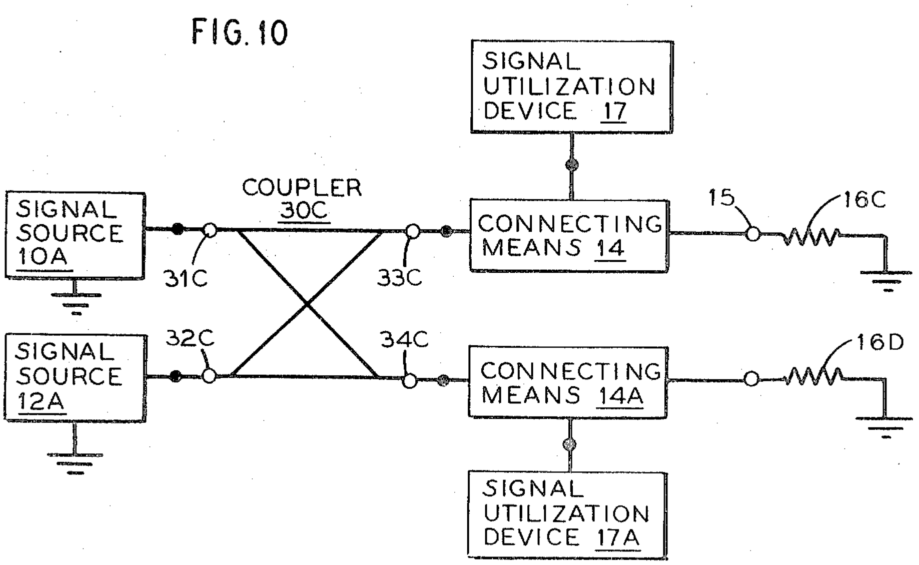
FIG. 10 shows an alternate embodiment of the apparatus of FIG. 1.

FIG. 10 shows another mixer according to the invention wherein the output port of RF signal source 10A is connected to one input port 31C of coupler 30C while the output port of LO signal source 12A is connected to another input port 32C of coupler 30C. The first output port 33C of coupler 30C is connected via connecting means 14 having terminals 13 and 15 to resistor (signal dissipation means) 16C; and the second output port 34C of coupler 30C is connected, via connecting means 14A, to resistor 16D. Connected to connecting means 14 is signal utilization device 17. The connecting means 14 and the signal utilization device 17 are as shown in FIG. 4, i.e., a coupler 30B as the connecting means and the mixing diodes 26 and 26A and the output filter 28 as the utilization device. The coupler 30B, in this case, should be of the 90° type while the coupler 30C can be of either type. The RF and LO signals are fed via coupler 30C and coupler 30B to diodes 26 and 26A where the mixing occurs. The filter 28 selects the desired IF signal, e.g. the difference-frequency signal. Isolation between signal source 10A and 12A is achieved by virtue of the signal isolation between ports 31C and 32C and low VSW ratio is achieved by virtue of the mixing diodes being connected to the ports of coupler 30B which is connected to coupler 30C.

While connecting means 14A can be a transmission line or the like with utilization device 17A as a matching impedance it is more desirable to use the apparatus of FIG. 4, i.e., coupler 30B, mixing diodes 26 and 26A and output filter 28, and parallel the outputs of the filters. In this way twice the signal output power is obtained for the IF signal.

Figure 11:
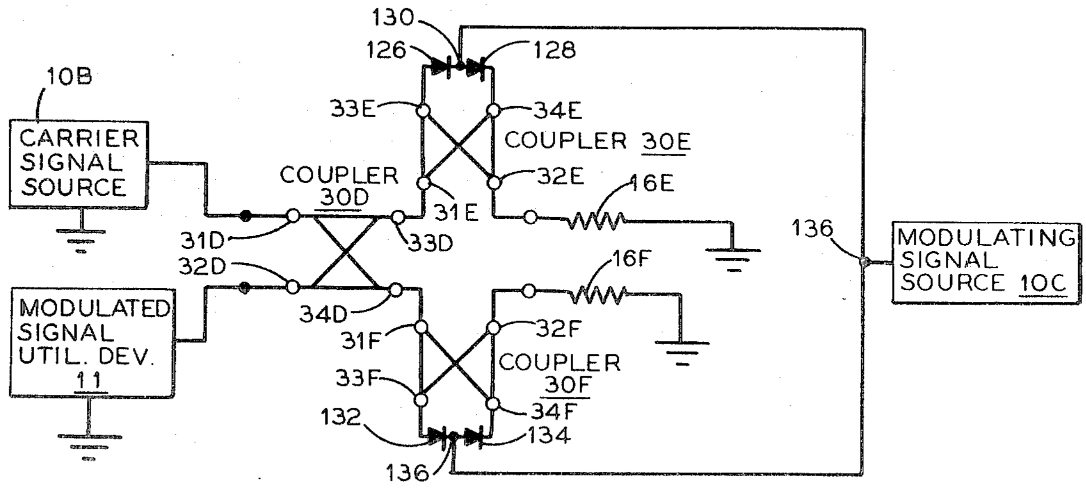
FIG. 11 shows a signal modulator according to another embodiment of the invention.

In FIG. 11 there is shown a modulator according to the invention. The modulator centers around three interconnected couplers 30D, 30E and 30F. Couplers 30E and 30F should be of the 90° type while coupler 30D can be of either type. The port 31D of the first pair of ports of couple 30D is connected to the output port of carrier signal source 10B while the port 32D of this same pair of ports of coupler 30D is connected to the input port of modulated signal utilization device 11. The port 33D of the second pair of ports of coupler 30D is connected to the port 31E of the first pair of ports of coupler 30E, while the other port 32E of this same pair of ports of coupler 30E is connected to resistor 16E. The other port 34D of the second pair of ports of coupler 30D is connected to the port 31F of the first pair of ports of coupler 30F, while the other port 32F of this same first pair of ports of coupler 30F is connected to resistor 16F. Connected across the second pair of ports 33E and 34E of coupler 30E are the serially connected diodes 126 and 128. Connected across the second pair of ports 33F and 34F OF coupler 30F are the serially connected diodes 132 and 134. The junction of diodes 126 and 128 is connected to common terminal 136, as is the junction of diodes 132 and 134. The terminal 136 is connected to the output of modulating signal source 10C.

In the presence of carrier signal from source 10B and modulating signal from source 10C, heterodyning takes place in diodes 126, 128, 132 and 134 and the modulated signal is transferred to device 11. signal is transferred to device 11.

Figure 12:
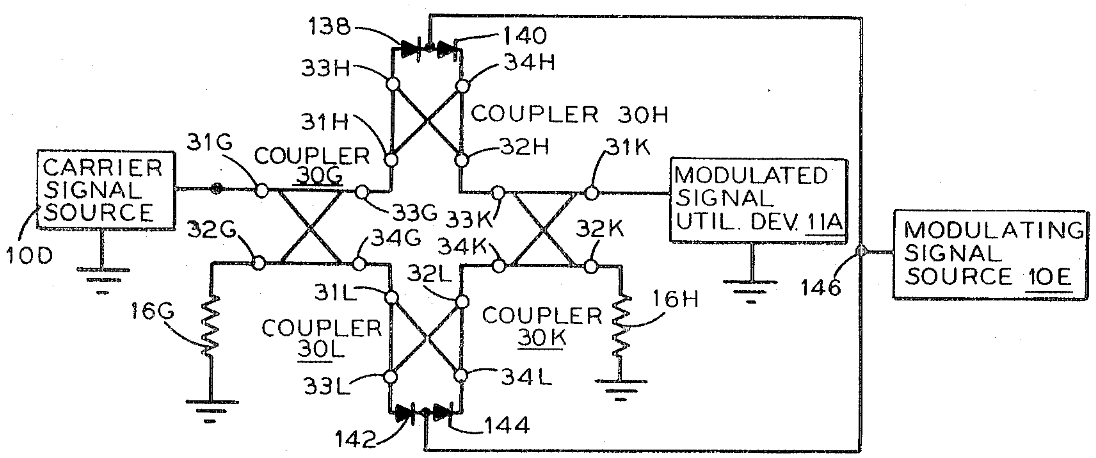
FIG. 12 shows another signal modulator according to a further embodiment of the invention.

FIG. 12 shows another modulator according to the invention centered around couplers 30G, 30H, 30K and 30L. Couplers 30H and 30L are of the 180° type and couplers 30G and 30K are of the same type and can be either type subject the same conditions as imposed on the device of FIG. 1. The output of carrier source 10D is connected to one port 31G of a first pair of ports of coupler 30G while the other port 32G of the pair is connected to resistor 16G. The port 33G of the second pair of ports of coupler 30G is connected to one port 31H of a first pair of ports of coupler 30H. The port 34G of the second pair of ports of coupler 30G is connected to one port 31L of a first pair of ports of coupler 30L. The input of modulated signal utilization device 11A is connected to one port 31K of a first pair of ports of coupler 30K while the other port 32K of the pair is connected to resistor 16H. The port 33K of the second pair of ports of coupler 30K is connected to the port 32H of the first pair of ports of coupler 30H. The port 34K of the second pair of ports of coupler 30K is connected to the port 32L of the first pair of ports of coupler 30L. Serially connected across the second pair of ports 33H and 34H of coupler 30H are the diodes 138 and 140; and serially connected across the second pair of ports 33L and 34L are The diodes 142 and 144. The junction of diodes 138 and 140 are connected to common terminal 146, as is the junction of diodes 142 and 144. Terminal 146 is connected to the output of modulating signal source 10E.

In the presence of carrier signal from source 10D and modulating signal from source 10E, heterodyning takes place in diodes 138, 140, 142 and 144 and the modulated signal is transferred to device 11A.

There has thus been shown improved signal-combining apparatus wherein the two signal sources are isolated from each other and which has a low VSW ratio.

There will now be obvious to those skilled in the art many modifications and variations which satisfy many or all of the objects of the invention but which do not depart from the spirit thereof as defined by the appended claims.

What is claimed is:

1. Alternating current signal-processing apparatus comprising: first and second couplers, each of said couplers having first and second pairs of ports wherein a signal received at one of the ports of a pair of ports is transmitted equally from the two ports of the other pair of ports but with different phases and each port of a pair of ports is signalwise isolated from the other port of the pair of ports; one port of the first pair of ports of said first coupler being adapted to receive a first signal; a first signal dissipation means connected to the other port of the first pair of ports of said first coupler; one port of the first pair of ports of said second coupler being adapted to receive a second signal; second signal dissipation means connected to the other port of the first pair of ports of said second coupler; first connecting means for connecting one port of the second pair of ports of said first coupler to one port of the second pair of ports of said second coupler; second connecting means for connecting the other port of the second pair of ports of said first coupler to the other port of the second pair of ports of said second coupler; a nonlinear impedance means having an input connected to at least one of said connecting means an output; and a signal filter means connected to the output of said nonlinear impedance means whereby said apparatus is a signal mixer.

2. The apparatus of claim 1 further comprising another nonlinear impedance device having an input connected to the other of said connecting means and an output, and another signal filter means connected to the output of said other nonlinear impedance means.

3. Alternating current signal-processing apparatus comprising: First and second couplers, each of said couplers having first and second pairs of ports wherein a signal received at one of the ports of a pair of ports is transmitted equally from the two ports of the other pair of ports but with different phases and each port of a pair of ports is signalwise isolated from the other port of the pair of ports; one port of the first pair of ports of said first coupler being adapted to receive a first signal; a first signal dissipation means connected to the other port of the first pair of ports of said first coupler; one port of the first pair of ports of said second coupler being adapted to receive a second signal; second signal dissipation means connected to the other port of the first pair of ports of said second coupler; first connecting means for connecting one port of the second pair of ports of said first coupler to one port of the second pair of ports of said second coupler; second connecting means for connecting the other port of the second pair of ports of said first coupler to the other port of the second pair of ports of said second coupler; at lease said first connecting means comprises a third coupler having first and second pairs of ports wherein a signal received at one of the ports of a pair of ports is transmitted equally from the two ports of the other pair of ports but with different phases and each port of a pair of ports is signalwise isolated from the other port of the pair of ports, means for connecting one port of the first pair of ports of said third coupler to one port of the second pair of ports of said first coupler, means for connecting the other port of the first pair of ports of said third coupler to one port of the second pair of ports of said second coupler; and a signal utilization device connected to the second pair of ports of said third coupler.

4. The apparatus of claim 3 wherein said signal utilization device comprises at least a nonlinear impedance means whereby said apparatus is a signal mixer.

5. The apparatus of claim 3 wherein said signal utilization device comprises first and second diodes serially connected across the ports of the second pair of ports of said third coupler, and a signal filter means having an input connected to the junction of said diodes.

6. The apparatus of claim 3 wherein said second connecting means comprises a fourth coupler having first and second pairs of ports wherein a signal received at one of the ports of a pair of ports is transmitted equally from the two ports of the other pair of ports but with different phases and each port of a pair of ports is signalwise isolated from the other port of the pair of ports, means for connecting one port of the first pair of ports of said fourth coupler to the other port of the second pair of ports of said first coupler, means for connecting the other port of the first pair of ports of said fourth coupler to the other port of the second pair of ports of said second coupler, and matching impedance means having an impedance substantially equal to the impedance of said signal utilization device, said matching impedance means being connected to the ports of the second pair of said fourth coupler.

7. The apparatus of claim 6 wherein said signal utilization device comprises a first nonlinear impedance means and said matching impedance means comprises a second nonlinear impedance means substantially similar to said first nonlinear impedance means.

8. The apparatus of claim 7 wherein said first nonlinear impedance means comprises first and second serially connected diodes connected across the second pair of ports of said third coupler, and a first signal filter means having an input connected to the junction of said first and second diodes.

9. The apparatus of claim 8 wherein said second nonlinear impedance means comprises third and fourth serially connected diodes connected across the second pair of ports of said fourth coupler, and a second signal filter means having an input connected to the junction of said third and fourth diodes.

10. A signal-heterodyning device comprising at least first and second couplers, each of said couplers having first and second pairs of signal transfer ports wherein a signal received at one of the ports of a pair of ports is transmitted equally from the two ports of the other pair of ports and each port of a pair of ports is signalwise isolated from the other port of a pair of ports, the first port of the first pair of ports of said first coupler being adapted to receive the signal having a first frequency, the second port of the first pair of ports of said first coupler being adapted to receive the signal having a second frequency, the first port of the second pair of ports of said first coupler being connected to the first port of the first pair of ports of said second coupler; a first signal dissipation means connected to the second port of the second pair of ports of said first coupler; a second signal dissipation means connected to the second port of the first pair of said second coupler; and a nonlinear impedance connected to the first and second ports of the second pair of ports of said second coupler, one of said ports connected to said nonlinear impedance being adapted to transmit the signal having the frequency which is heterodyningly related to said first and second frequencies so that the device is a signal mixer.

11. A signal-heterodyning device comprising at least first, second and third couplers, each of said couplers having first and second pairs of signal transfer ports wherein a signal received at one of the ports of a pair of ports is transmitted equally from the two ports of the other pair of ports and each port of a pair of ports is signalwise isolated from the other port of a pair of ports, means for connecting the first port of the first pair of ports of said first coupler to the first port of the first pair of ports of said second coupler, means for connecting the second port of the first pair of ports of said first coupler to the first port of the first pair of ports of said third coupler, a first signal dissipation means, means for connecting the second ports of the first pair of ports of said second and third couplers to at least said first signal dissipation means, a first nonlinear impedance including a signal transfer terminal, means for connecting said first nonlinear impedance across the second pair of ports of said second coupler, a second nonlinear impedance including a signal transfer terminal, means for connecting said second nonlinear impedance across the second pair of ports of said third coupler, and means for interconnecting said signal transfer terminals, the first port of the second pair of ports of said first coupler being adapted to receive a signal of a first frequency, one of said common signal transfer terminal and the second port of the second pair of ports of said first coupler being adapted to receive a signal of a second frequency, and the other of said common signal transfer terminal and the second port of the second pair of ports of said first coupler being adapted to transmit a signal having a frequency which is heterodyningly related to said first and second frequencies.

12. The signal-heterodyning device of claim 11 further comprising a first frequency signal source connected to the first port of the second pair of ports of said first coupler, a second frequency signal source connected to the second port of the second pair of ports of said first coupler, and a signal utilization device connected to said common signal transfer terminal.

13. The signal-heterodyning device of claim 11 further comprising a first frequency signal source connected to the first port of the second pair of ports of said first coupler, a second frequency signal source connected to said common signal transfer terminal, and a signal utilization device connected to the second port of the second pair of ports of said first coupler.

14. A signal-heterodyning device comprising first, second, third and fourth couplers, each of said couplers having first and second pairs of signal transfer ports wherein a signal received at one of the ports of a pair of ports is transmitted equally from the two ports of the other pair of ports and each port of a pair of ports is signalwise isolated from the other port of a pair of ports, means for connecting the first port of the first pair of ports of said first coupler to the first port of the first pair of ports of said second coupler, means for connecting the second port of the first pair of ports of said first coupler to the first port of the first pair of ports of said third coupler, means for connecting the first port of the first pair of ports of said fourth coupler to the second port of the first pair of ports of second coupler, means for connecting the second port of the first pair of ports of said fourth coupler to the second port of the first pair of ports of said third coupler, a first signal dissipation means, means for connecting said first signal dissipation means to the second port of the second pair of ports of said fourth coupler, a second signal dissipation means connected to the second port of the second pair of ports of said first coupler, a first nonlinear impedance including a signal transfer terminal, means for connecting said first nonlinear impedance across the second pair of ports of said second coupler, a second nonlinear impedance including a signal transfer terminal, means for connecting said second nonlinear impedance across the second pair of ports of said third coupler, means for connecting said signal transfer terminals to form a common signal transfer terminal, a first frequency signal source connected to the first port of the second pair of ports of said first coupler, a second frequency signal source connected to said common signal transfer terminal, a signal utilization device connected to the first port of the second pair of ports of said fourth coupler, and third signal dissipation means connected to the second port of said second pair of ports of said fourth coupler.

* * * * *